(12) United States Patent  
Mahmoud

(10) Patent No.: US 9,238,771 B1  
(45) Date of Patent: Jan. 19, 2016

(54) NON-COILED TUBING WELL CLEAN-UP

(71) Applicants: King Fahd University of Petroleum and Minerals, Dhahran (SA); King Abdulaziz City for Science and Technology, Riyadh (SA)

(72) Inventor: Mohamed Ahmed Mahmoud, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 14/473,113

(22) Filed: Aug. 29, 2014

(51) Int. Cl.
*C09K 8/528* (2006.01)
*E21B 37/06* (2006.01)

(52) U.S. Cl.
CPC .............. *C09K 8/528* (2013.01); *E21B 37/06* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 6,140,277 A * | 10/2000 | Tibbles et al. | 507/201 |
| 6,569,814 B1 | 5/2003 | Brady et al. | |
| 8,071,511 B2 | 12/2011 | Welton et al. | |
| 2001/0036905 A1 * | 11/2001 | Parlar et al. | 507/200 |
| 2004/0045710 A1 * | 3/2004 | Fu et al. | 166/282 |
| 2012/0094878 A1 * | 4/2012 | Al-Mutairi et al. | 507/267 |
| 2012/0208726 A1 * | 8/2012 | Smith et al. | 507/201 |

* cited by examiner

*Primary Examiner* — Kevin Flynn
*Assistant Examiner* — Anuradha Ahuja
(74) *Attorney, Agent, or Firm* — Oblon, McClelland, Maier & Neustadt, L.L.P.

(57) ABSTRACT

A well clean-up fluid system than can be used to remove the filter cake in horizontal and multilateral sections of extended-reach and maximum-reservoir-contact wells for both open and cased hole completions. The fluid system contains one or more low pH chelating agents and a viscoelastic surfactant. The fluid is injected through a drill pipe and starts reacting with the filter cake after rigging down. This method of the well clean-up eliminates the use of coil tubing, enzymes and corrosion inhibitors. The efficiency of filter cake removal is enhanced because the well clean-up fluid system has the ability to divert through the highly damaged areas of well or formation in the horizontal section.

17 Claims, 2 Drawing Sheets

NON-COILED TUBING WELL CLEAN-UP

BACKGROUND OF THE INVENTION

1. Technical Field

The present invention relates to methods and compositions for removing a filter cake in a wellbore after drilling, especially horizontal sections of extended-reach and maximum-reservoir-contact wells in both open and cased hole completions.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

During drilling operations, the invasion of drilling fluid and particles that are smaller than the pore size of the drilled-formations into the zone around the well bore is one of the major factors contributing to reducing the productivity in the permeable zone by physical and/or chemical change to formation rock or fluids. This impairment is commonly referred to as formation damage. The volume of materials infiltrating the formation has a significant consequence on the extent of formation damage.

Typically over the permeable formation, filter cake is formed intentionally during drilling operations to prevent fluid losses to the formation and to allow good circulation of drilling fluids from the bottom hole to the surface. The filter cake composition depends on a well-designed drilling fluids and additives. The filter cake should allow for minimum filtration, e.g., minimum passage of drilling fluids through the filter cake into the formation, prevent invasion of solids into the formation, and withstand high differential overbalance pressures. For this reason, the drilling mud program usually involves comprehensive testing procedures to determine filtration rate and for better understanding of filter cake properties including cake porosity, permeability, structure, and others. Such information leads to the formation of an effective filter cake with properties that minimize the formations damage.

Investigators have strived to obtain a better understanding of the microscopic structure of the filter cakes by using different techniques. Several devices have been used to study the structure of filter cake such as scanning electron microscopy (SEM), X-ray diffraction (XRD) and X-Ray Fluorescence (XRF).

On the other hand, the generated filter cake has to be removable to maximize the well productivity. Thereby, good knowledge of filter cake structure and composition leads to successful selection of an effective and efficient process and recipe for removing the filter cake. This issue becomes more severe in the maximum-reservoir contact and extended-reach wells due to the heterogeneity of the filter cake properties in the horizontal section and the presence of the fine drilling cutting particles in the filter cake in high concentrations which also degrade the sealing properties of the cake and leads to deep invasion. This makes it critical for investigators to have an effective technique for obtaining a typical filter cake sample and for removing the filter cake from the well bore. A filter cake operation that suffers problem may lead to extra formation damage in the target hydrocarbon production formation on top of that already existing during drilling operation. This in turn will add to the challenges of casing the well. In one aspect, as a filter cake that is formed over a permeable formation can be designed to include a bridging agent and a polymeric suspending agent. Such additives may help prevent the invasion of drilling fluid and drilling solids into the formation during the drilling operation. The filter cake removal composition should not be too aggressive to avoid early failure which may cause low removal efficiency and loss of the removal composition. A filter cake removal solution/composition may contain acidic components which may corrode the metallic of surface of drilling, casing or completion equipment.

Several methods are employed to overcome the challenge. The most recent method is the employment of two stage filter cake removal as described in U.S. Patent Application Publications US20130146289, US20130146295 and PCT Patent Application Publication WO2013160334 (each incorporated herein by reference in its entirety) that includes an enzyme, and a mixture of hydrochloric acid and an organic acid to remove the filter cake generated by a manganese-tetra oxide-based drilling fluid. The two stage filter cake removal composition is used by first applying the enzyme in a first stage for about 1 to 4 days based on the filter cake composition, the enzyme concentration and its thermal stability. In a second stage a mixture of hydrochloric acid and an organic acid is applied to the filter cake in the target production formation for about 18 hours and at about 250° F. The method comprising two stages aims to remove the filter cake of target production zone over an extended reaction time to control fluid loss from the wellbore.

U.S. Pat. No. 6,569,814 and US2001/0036905 (each incorporated herein by reference in its entirety) discloses fluids and methods of removing the filter cake or cleaning the well after drilling that includes the use of the coiled tubing unit but may not be efficient towards long horizontal wells.

A filter cake removal recipe must therefore meet several important requirements in order to operate effectively and provide high removal efficiency. Uncontrolled fluid losses of treatment fluids during removing the filter cake is a problem associated with filter cake removal in long open hole laterals. Such losses may lead to large portions of the well bore being untreated in intervals and result in filter cake remaining in the well bore. In high contrast or dense filter cakes which have low permeability, this problem becomes more severe.

Extended-reach drilling in carbonate and sandstone reservoirs is being used due to several reasons such as offshore drilling, maximizing reservoir contact, increasing production rate, and for thin reservoir access. The well clean-up is a very difficult process in long lateral horizontal wells because drilling fluid invasion can cause substantial damage to the well and/or the formation. Typically a drilling rig takes several days to be rigged down from the well and during this period the damage to the well and/or to the formation may increase. Coiled tubing is conventionally required to place the clean-up fluids to remove the damage caused by drilling fluid which. Coiled tubing processes are costly and time consuming.

In some cases, the horizontal well length might reach 20,000 ft or more. Currently available well clean-up fluid formulations are not able to clean up the well after drilling. In addition, coiled tubing is needed after the rigging down process is completed. This means more time and more damage to the horizontal section. Long horizontal wells may benefit from very low reactive fluids to clean the well and delayed reaction until after placing the fluid in the well.

Therefore, a need exists for methods and compositions that can remain in contact with the filter cake for a period of time sufficient to degrade the filter cake and can divert treated fluid to different sections in long laterals.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

Embodiments of the present invention describe a non-coiled tubing well clean-up process to clean the well immediately after drilling in carbonate and sandstone reservoirs. The clean-up fluid is a formulation of low pH (hydroxyethyl) ethylenediaminetriacetic acid (HEDTA) (pH=4) and a viscoelastic surfactant (VES). The fluid system is pumped through a drill pipe after finishing a drilling process and starts reacting after five days or more (e.g., the diffusion rate can be controlled by the VES concentration added to the (hydroxyethyl)ethylenediaminetriacetic acid. The delay time to activation and completion may pass while the rigging down process of the well is completed. Only (hydroxyethyl) ethylenediaminetriacetic acid and VES are required for the treatment, and there is no need for other additives such as enzymes and corrosion inhibitors.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
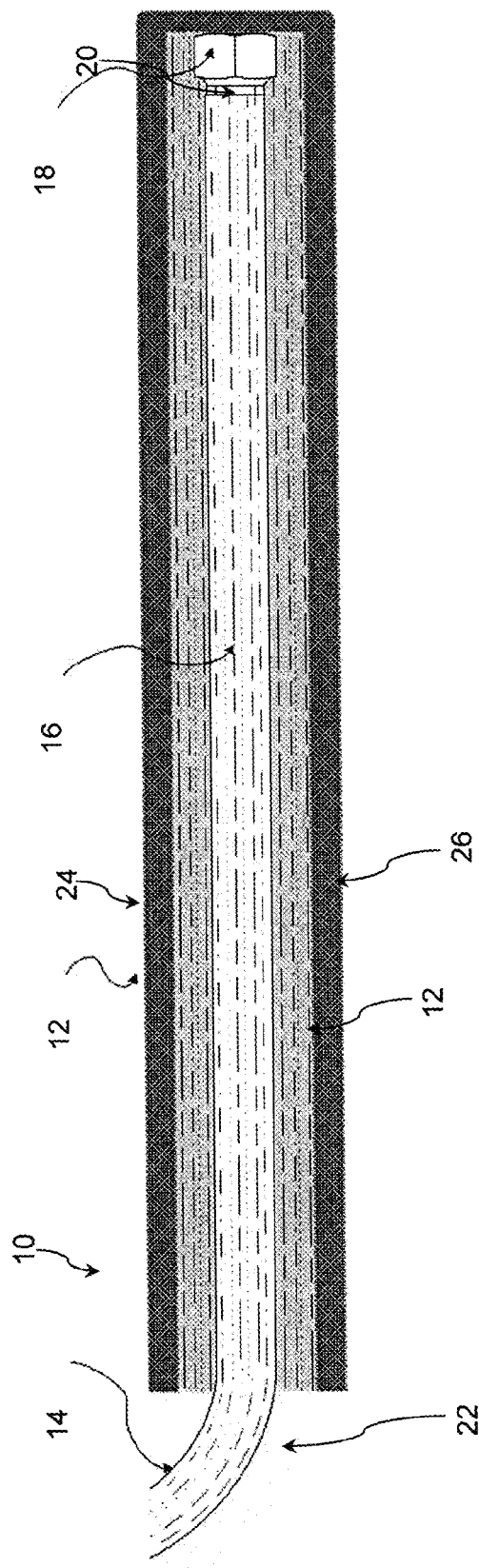
FIG. 1 illustrates the placement of the clean-up fluid after the drilling of the horizontal well has been completed.

Referring now to the drawings, wherein like reference numerals designate identical or corresponding parts throughout the several views.

The present invention is directed to a new well clean-up fluid that can be pumped through the drill pipe after the drilling process in horizontal and multilateral sections of extended-reach and maximum-reservoir-contact wells has been completed. In the present invention, (hydroxyethyl)ethylenediaminetriacetic acid (HEDTA), a low pH chelating agent and a viscoelastic surfactant (VES) are used to clean long horizontal wells through the drill pipe without the use of coiled tubing to deliver the formulation to the well. The new formulation is suitable for water injectors, oil producers, and carbonate or sandstone reservoirs at high temperature, and low temperature. It can handle a wide range of reservoir and well conditions.

For purposes of the present invention, an extended-reach well is a hydrocarbon-producing well in which the ratio of the measured depth versus the true vertical depth is at least 2:0.

For purposes of the present invention, a maximum-reservoir-contact well is a hydrocarbon-producing well having an aggregate reservoir contact in excess of 5 km, through a single or multilateral configuration.

For purposes of the present invention, rigging down is a process of dissembling the drilling rig from the well after drilling to prepare the well for oil production. After production casing is run and cemented, the drilling rig is disconnected from the power source, taken down and moved to another site. Rigging down is basically a reverse process of rigging up where the various parts of equipment making up the drilling rig are placed and assembled to prepare the rig for drilling. Rigging down may include disassembling and removing the rig substructure, removing the rig floor, mast and/or derrick, removing the power system, removing the circulating system, and/or removing the auxiliary equipment.

In one embodiment, the concentration of (hydroxyethyl) ethylenediaminetriacetic acid can be varied from 5 to 50 wt %, preferably 10 to 40 wt %, 15 to 30 wt %, or 20 to 25 wt %, and the VES concentration is within the range of 3 to 15 wt %, preferably 4 to 10 wt %, 5 to 9 wt %, or 6 to 8 wt %. The concentration of (hydroxyethyl)ethylenediaminetriacetic acid and VES can be determined based on the well conditions. For example, if the rigging down process will take 7 days the formulation can be designed to start reaction and remove the filter cake and clean the well within 7 days and the well could be flowed for production. The new formulation has very low corrosion rate with the drill pipe and casing materials and there is no need to add corrosion inhibitors. In some embodiments, the rigging down process takes 3 to 10 days to complete, preferably 4 to 9 days, 4 to 8 days, or 5 to 7 days.

In some embodiments, the filter cake may contain remnants of the weighting agents found in drilling fluids, for example, calcium carbonate, barium sulfate, manganese tetraoxide and polymers. These contents can be efficiently removed by the clean-up fluid disclosed herein. The thickness of a filter cake may be up to 2 in, preferably 0.1 to 1 in or 0.1 to 0.5 in.

In some embodiments, the disclosed well clean-up fluid can be used in horizontal wells for both open hole (to allow production) and cased hole (to achieve good cement) completions with lateral length of 3,000-20,000 ft in homogenous or heterogeneous carbonate or sandstone reservoirs. After the placement of the fluid in the horizontal section, the drill pipe can be removed from the well, and this might take up to one week. The reaction will start and the damage can be removed easily, after that the well could be flowed back for production. This method will save the cost of the coiled tubing and also it is more efficient than the fluids used currently in well clean-up in extended-reach wells.

In some embodiments, chelating agents other than (hydroxyethyl)ethylenediaminetriacetic acid can be used at pH values less than 6. In some embodiments, the pH range is between 3.7 and 6.3, preferably 4 to 6 or 4.5 to 5.5. Examples of these chelating agents are ethylenediaminetetraacetic acid (EDTA), diethylene triamine pentaacetic (DTPA), methylglycindiactic (MGDA), nitrilotracetic (NTA), 2-hydroxyethyliminodiacetic (HEIDA), and L-glutamic acid N,N-diacetic acid (GLDA).

Viscosity of a VES fluid is created by self-assembly of surfactant molecules in an aqueous solution. Hydrophobic tails of surfactants associate and orient to create rod shaped structures commonly referred to as micelles. Entanglement of these flexible micelles imparts viscosity to the solution. In this present invention, different versions of ionic or non-polymeric VES could be used to viscosify the chelating agent, for example including anionic surfactants, cationic surfactants, and zwitterionic surfactants.

The anionic surfactant may be selected from compounds including but not limited to alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated or propoxylated sulfated dodecyl phenols. The anionic surfactant may be selected from compounds including but not limited to alkyl sulfates and alpha olefin sulfates, dodecylbenzene sulfonic acid, linear and branched alkyl benzene sulfonates, dodecylbenzene sulfonic acid, and linear and branched alkyl benzene sulfonates.

The cationic surfactant may be selected from compounds including but not limited to pH-dependent primary, secondary, or tertiary amines, octenidine dihydrochloride, permanently charged quaternary ammonium cations such as alkyltrimethylammonium salts: cetyl trimethylammonium bromide (CTAB) that are also known as hexadecyl trimethyl ammonium bromide, cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide (DODAB).

Zwitterionic (amphoteric) surfactants have both cationic and anionic centers attached to the same molecule. In some embodiments, the cationic part may be selected from compounds including but not limited to primary, secondary, or tertiary amines or quaternary ammonium cations. The anionic part may be more variable and may include sulfonates, as in CHAPS (3-[(3-Cholamidopropyl)dimethylammonio]-1-propanesulfonate), sultaines cocamidopropyl hydroxysultaines. betaines, such as cocamidopropyl betaines In some embodiments, nonionic surfactants may be used to viscosify the chelating agent. The nonionic surfactant is selected from compounds including but not limited to ethoxylated octyl phenols, polypropylene glycols, ethoxylated linear alcohols, and ethoxylated nonyl phenols. The hydrotropic surfactant is selected from compounds including but not limited to dicarboxylic acids, phosphate esters, sodium xylene sulfonate, and sodium dodecyl diphenyl ether disulfonate. The hydrophobic organic alcohol is selected from compounds including but not limited to ethanol, diethanol, and propanol alcohol ethers, ethylbenzyl alcohol, 2-propanol, 2-ethyl-1-hexanol, 1-octanol, and 2-octanol, and mixtures thereof.

In some embodiments, polymers such as polyacrylamide may be used to viscosify the HEDTA. No other additives are required for this process because the VES will work as both a viscofying and wetting material during the well clean-up process.

In a preferred embodiment, sea water is used as a base fluid in the formulation. Sea water has greater viscosifying properties than fresh water and it helps in viscosifying the surfactant to delay the reaction between the treatment fluid and the filter cake. In some regions, sea water may also be more readily available than fresh water. The sea water according to the present invention is composed primarily of elements such as oxygen (80-87%), hydrogen (8-12%), chloride (1.5-2.1%), sodium (0.9-1.3%), traces of magnesium (0.08-0.13%), sulfur (0.07-0.1%), calcium (0.03-0.05%), potassium (0.03-0.05%), bromine (0.006-0.007%) and carbon (0.002-0.003%).

In some embodiments, the filter cake may contain polymers. Starch and enzymes could be injected with the HEDTA and VES system to degrade the polymers. In some embodiments, no enzyme is needed since some chelating agents can attack the polymer backbone.

In some embodiments, the well treatment or clean-up fluid may comprise at least one chelating agent, at least one viscoelastic surfactant and an aqueous solvent as a base fluid. In some embodiments, the well treatment or clean-up fluid may consist essentially of at least one chelating agent, at least one viscoelastic surfactant and an aqueous solvent as a base fluid.

In some embodiments, the well treatment or clean-up fluid may consist of at least one chelating agent, at least one viscoelastic surfactant and an aqueous solvent as a base fluid.

In some embodiments, the well treatment or clean-up fluid may comprise at least one chelating agent, at least one viscoelastic surfactant, an aqueous solvent as a base fluid, at least one polymer, starch, at least one enzyme and at least one corrosion inhibitor.

In some embodiments, the well treatment or clean-up fluid may consist essentially of at least one chelating agent, at least one viscoelastic surfactant, an aqueous solvent as a base fluid, at least one polymer, starch, at least one enzyme and at least one corrosion inhibitor.

In some embodiments, the well treatment or clean-up fluid may consist of at least one chelating agent, at least one viscoelastic surfactant, an aqueous solvent as a base fluid, at least one polymer, starch, at least one enzyme and at least one corrosion inhibitor.

FIG. 1 shows the placement of the (hydroxyethyl)ethylenediaminetriacetic acid and VES fluid system into the horizontal section of a wellbore. Horizontal well 10 includes an open end 22, a closed end 20, upper lateral side 24 and lower lateral side 26. Drill pipe 14 is installed into horizontal well 10 through open end 22 and reaches all the way up to closed end 20 wherein drilling bit 18 is secured to the closed end. After a drilling process, a layer of filter cake 12 is formed on both lateral sides of the well. In the present invention, fluid 16 can be safely injected through drill pipe 14 upon completion of a drilling process without use of coiled tubing. The low diffusion rate of fluid 16 is attributed to the VES concentration added into the formulation to viscosify HEDTA and helps to prevent the uncontrollable fluid loss problem in the prior art. The formulation also helps the injected fluid stay unreactive for approximately five days while the rigging down process takes place after the drilling is over. Once the rigging down process is finished, fluid 16 will start reacting with the filter cake layers to break them down.

Figure 2:
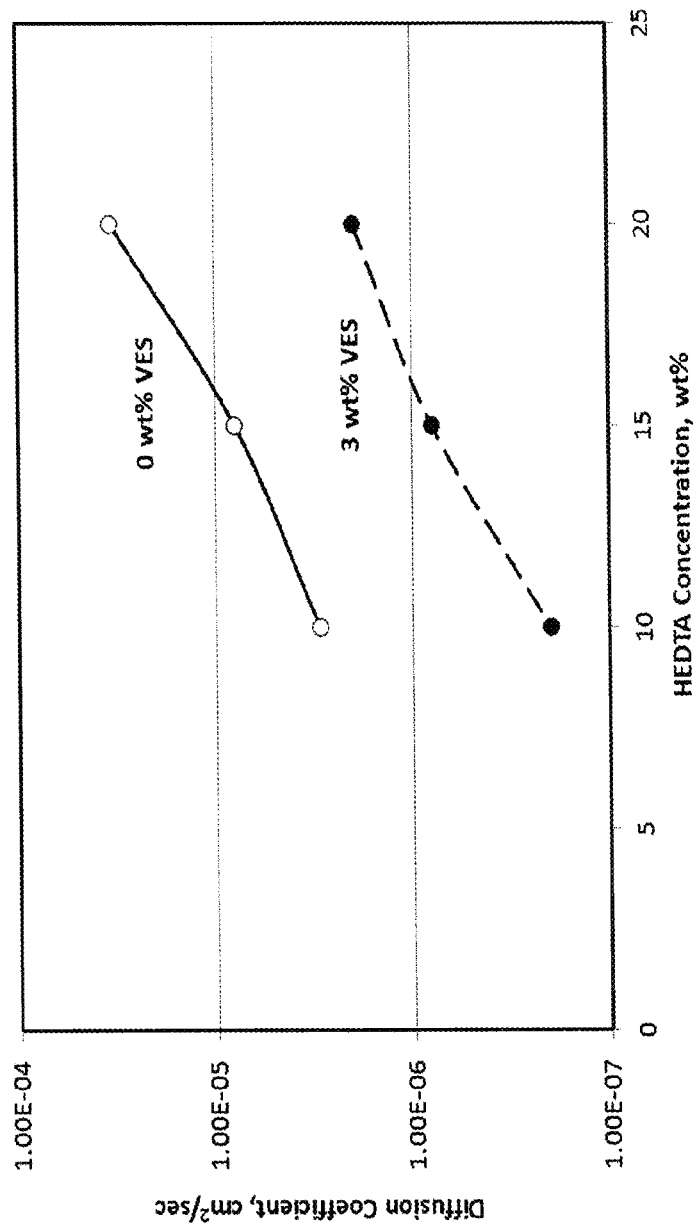
FIG. 2 is a graph showing the effect of 3% VES on the diffusion coefficient of HEDTA (pH=4) with calcite.

The effect of VES addition to (hydroxyethyl)ethylenediaminetriacetic acid diffusion coefficient to calcite is shown in FIG. 2. The diffusion coefficient controls the reaction rate. In some embodiments, the diffusion coefficients may be between $10^{-9}$ cm$^2$/s to $10^{-5}$ cm$^2$/s, preferably $10^{-9}$ cm$^2$/s to $10^{-6}$ cm$^2$/s. In the present invention, lowering of the diffusion coefficient results in a decreased reaction rate. The higher the concentration of VES is in the formulation of the well clean-up or treatment fluid, the lower the reaction rate is. In one embodiment, addition of 3 wt % VES leads to a lower diffusion rate to calcite by approximately one order of magnitude at varying (hydroxyethyl)ethylenediaminetriacetic acid concentrations, for example from approximately $10^{-5}$ cm$^2$/s to $10^{-6}$ cm$^2$/s at 15 wt % (hydroxyethyl)ethylenediaminetriacetic acid. In some embodiments, with higher concentrations of VES added, the treatment fluid may have diffusion coefficients of $10^{-9}$ cm$^2$/s to $10^{-7}$ cm$^2$/s.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of treating a filter cake present in at least one of a horizontal section and a multilateral section of a hydrocarbon-producing well, comprising:
    drilling the hydrocarbon-producing well with a drilling rig,
    injecting into the hydrocarbon-producing well,
    a treatment fluid having a diffusion coefficient of $10^{-9}$ to $10^{-6}$ cm$^2$/s and comprising (hydroxyethyl)ethylenediaminetriacetic acid, a viscoelastic surfactant and an aqueous solvent, and
    initiating breakdown and removal of the filter cake five days or more after the injecting, and
    rigging down the drilling rig,
    wherein the break down and removal of the filter cake occurs during the rigging down of the drilling rig.

2. The method of claim 1, wherein the treatment fluid is injected into the hydrocarbon-producing well through a drill pipe.

3. The method of claim 1, wherein the treatment fluid is injected into the hydrocarbon-producing well without a coiled tubing unit.

4. The method of claim 1, wherein the method excludes enzymes.

5. The method of claim 1, wherein the method excludes corrosion inhibitors.

6. The method of claim 1, wherein the treatment fluid comprises 10-20% of the (hydroxyethyl)ethylenediaminetriacetic acid by weight based on the total weight of the treatment fluid and 3-7% of the viscoelastic surfactant by weight based on the total weight of the treatment fluid.

7. The method of claim 1, wherein the viscoelastic surfactant is non-polymeric.

8. The method of claim 7, wherein the non-polymeric viscoelastic surfactant is anionic, cationic, nonionic or zwitterionic.

9. The method of claim 1, wherein the viscoelastic surfactant is polymeric.

10. The method of claim 1, wherein the aqueous solvent is sea water.

11. The method of claim 1, wherein the hydrocarbon-producing well can be either an open or cased hole completion.

12. The method of claim 1, wherein the horizontal and multilateral sections of the hydrocarbon-producing well have a lateral length within the range of 3,000-20,000 ft.

13. The method of claim 1, wherein the treatment fluid has a diffusion coefficient of $10^{-9}$ to $10^{-7}$ cm$^2$/s and comprises 10-15% of the (hydroxyethyl)ethylenediaminetriacetic acid by weight based on the total weight of the treatment fluid and 3-5% of the viscoelastic surfactant by weight based on the total weight of the treatment fluid.

14. The method of claim 1, wherein the (hydroxyethyl)ethylenediaminetriacetic acid has a pH of 4 to 6.

15. The method of claim 1, wherein the treatment fluid consists essentially of the (hydroxyethyl)ethylenediaminetriacetic acid, the viscoelastic surfactant and water.

16. The method of claim 1, wherein the treatment fluid consists of the (hydroxyethyl)ethylenediaminetriacetic acid, the viscoelastic surfactant and water.

17. The method of claim 1, wherein the total amount of the (hydroxyethyl)ethylenediaminetriacetic acid and the viscoelastic surfactant in the treatment fluid is from 13 to 27 wt % based on the total weight of the treatment fluid.

* * * * *